United States Patent
Yamazaki et al.

(10) Patent No.: US 9,399,461 B2
(45) Date of Patent: Jul. 26, 2016

(54) OPPORTUNISTIC CHARGING OF HYBRID VEHICLE BATTERY

(71) Applicant: FORD GLOBAL TECHNOLOGIES, LLC, Dearborn, MI (US)

(72) Inventors: Mark Steven Yamazaki, Canton, MI (US); Christopher Alan Lear, Dearborn, MI (US); Francis Thomas Connolly, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 182 days.

(21) Appl. No.: 13/865,587

(22) Filed: Apr. 18, 2013

(65) Prior Publication Data
US 2013/0297126 A1    Nov. 7, 2013

Related U.S. Application Data

(60) Provisional application No. 61/643,508, filed on May 7, 2012.

(51) Int. Cl.
| | |
|---|---|
| *B60W 20/00* | (2016.01) |
| *B60W 10/06* | (2006.01) |
| *B60W 10/08* | (2006.01) |
| *B60W 10/02* | (2006.01) |
| *B60K 6/48* | (2007.10) |
| *B60W 30/18* | (2012.01) |

(52) U.S. Cl.
CPC .............. *B60W 20/40* (2013.01); *B60K 6/48* (2013.01); *B60W 10/02* (2013.01); *B60W 10/06* (2013.01); *B60W 10/08* (2013.01); *B60W 30/18054* (2013.01); *B60K 2006/4825* (2013.01); *B60W 2510/0642* (2013.01); *B60W 2510/244* (2013.01); *B60W 2600/00* (2013.01); *B60W 2710/081* (2013.01); *Y02T 10/6221* (2013.01); *Y02T 10/6252* (2013.01); *Y02T 10/6286* (2013.01); *Y10S 903/93* (2013.01)

(58) Field of Classification Search
CPC ............................... B60W 10/02; B60W 10/06
USPC ............ 701/22; 180/65.1, 65.2, 65.265, 65.3, 180/65.6, 69.4; 290/40 A, 40 B, 40 C, 40 R, 290/38 R, 45, 46; 318/8, 9, 34, 51, 52; 903/930

See application file for complete search history.

(56) References Cited

U.S. PATENT DOCUMENTS

| | | | | |
|---|---|---|---|---|
| 5,936,312 | A * | 8/1999 | Koide et al. ................. | 290/40 R |
| 6,356,817 | B1 * | 3/2002 | Abe ............................... | 701/22 |
| 6,480,767 | B2 * | 11/2002 | Yamaguchi et al. ........... | 701/22 |

(Continued)

*Primary Examiner* — Jerrah Edwards
*Assistant Examiner* — Majdi Alsomiri
(74) *Attorney, Agent, or Firm* — David B. Kelley; Brooks Kushman P.C.

(57) ABSTRACT

A control system for a modular hybrid electric vehicle operates an internal combustion engine at a torque level above the driver demanded torque improving the engine's efficiency. A traction motor driveably connected to the engine is operated at a torque level such that the combined torque satisfies the driver demand. The traction motor torque is limited to avoid inefficient combinations of speed and torque at which the motor is inefficient. During idle operation, the traction motor is operated at a torque determined from a battery state of charge and the engine is operated to maintain a predetermined speed. If the engine speed drops below a threshold, motor torque is adjusted to reduce the load on the engine to avoid stalling.

9 Claims, 2 Drawing Sheets

(56) References Cited

U.S. PATENT DOCUMENTS

| | | | |
|---|---|---|---|
| 6,561,296 B2 * | 5/2003 | Obayashi | 180/65.26 |
| 6,827,167 B2 * | 12/2004 | Cikanek et al. | 180/65.6 |
| 7,295,902 B2 | 11/2007 | Chen et al. | |
| 7,869,913 B2 * | 1/2011 | Aoyama et al. | 701/22 |
| 7,900,726 B2 * | 3/2011 | Kidston et al. | 180/65.29 |
| 8,116,926 B2 * | 2/2012 | Okubo et al. | 701/22 |
| 8,738,203 B2 * | 5/2014 | Liu et al. | 701/22 |
| 2001/0017227 A1 | 8/2001 | Amano et al. | |
| 2004/0157704 A1 * | 8/2004 | Stork | B60W 10/02 477/166 |
| 2009/0177345 A1 * | 7/2009 | Severinsky et al. | 701/22 |
| 2009/0318261 A1 * | 12/2009 | Tabata et al. | 477/3 |
| 2011/0184602 A1 * | 7/2011 | Severinsky et al. | 701/22 |
| 2011/0190971 A1 * | 8/2011 | Severinsky et al. | 701/22 |

* cited by examiner

OPPORTUNISTIC CHARGING OF HYBRID VEHICLE BATTERY

CROSS-REFERENCE TO RELATED APPLICATION

This application claims the benefit of U.S. provisional Application No. 61/643,508, filed May 7, 2012, the disclosure of which is incorporated in its entirety by reference herein.

TECHNICAL FIELD

The present disclosure relates to a control strategy for a hybrid electric vehicle. In particular, the disclosure relates to a strategy for charging the electric battery using an internal combustion engine.

BACKGROUND

Vehicles commonly employ variable ratio transmissions to transfer power between an internal combustion engine and the vehicle wheels. In an automatic transmission, a controller selects the transmission ratio in response to the vehicle speed and a driver demand, usually communicated by depressing an accelerator pedal. In a Modular Hybrid Transmission (MHT) architecture, the vehicle also has a traction motor connected at the input of the transmission. The traction motor is electrically connected to a battery. The motor can be used in either a motoring mode in which energy from the battery is used to supplement the engine power or in a generating mode in which the motor converts mechanical energy into electrical energy which is stored in the battery.

SUMMARY OF THE DISCLOSURE

A method of operating a modular hybrid vehicle powertrain includes engaging an engine disconnect clutch, operating a traction motor to charge a battery by generating a charging torque based on the battery state of charge, and controlling an engine to respond to the increased load by increasing engine torque. If the engine speed decreases below a threshold, the method may include decreasing the charging torque to decrease the load on the engine. The method may further include engaging a launch clutch, controlling the engine to produce an engine torque based on the engine speed and the battery state of charge, and controlling the motor to produce a charging torque such that the combined torque of the engine and the motor satisfied a driver demanded torque. The method may further include controlling the motor to generate a minimum charging torque based on engine speed.

A method of operating a traction motor includes applying a negative torque to an engine while generating electrical power such that the torque is independent of rotor speed and then responding to a decrease in rotor speed below a threshold by increasing the torque to decrease the load on the engine. The negative torque may be based on the state of charge of a battery.

A vehicle powertrain includes an engine, a motor electrically connected to a battery, an engine disconnect clutch selectively coupling the engine to the motor, and a controller. The controller is programmed to engage the engine disconnect clutch, operate the motor to generate a first charging torque based on the state of charge of the battery, and respond to any resulting decrease in engine speed by increasing the torque produced by the engine. The controller may be further programmed to respond to a decrease in engine speed below a threshold value by adjusting the charging torque to decrease the load on the engine. The powertrain may also include a transmission gearbox and a launch clutch selectively coupling the motor to the input of the transmission gearbox. The controller may be further programmed to engage the launch clutch, control the engine to produce an engine torque based on the engine speed and the battery state of charge, and control the motor to produce a charging torque such that the sum of the engine torque and eth charging torque satisfies a driver demanded torque.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
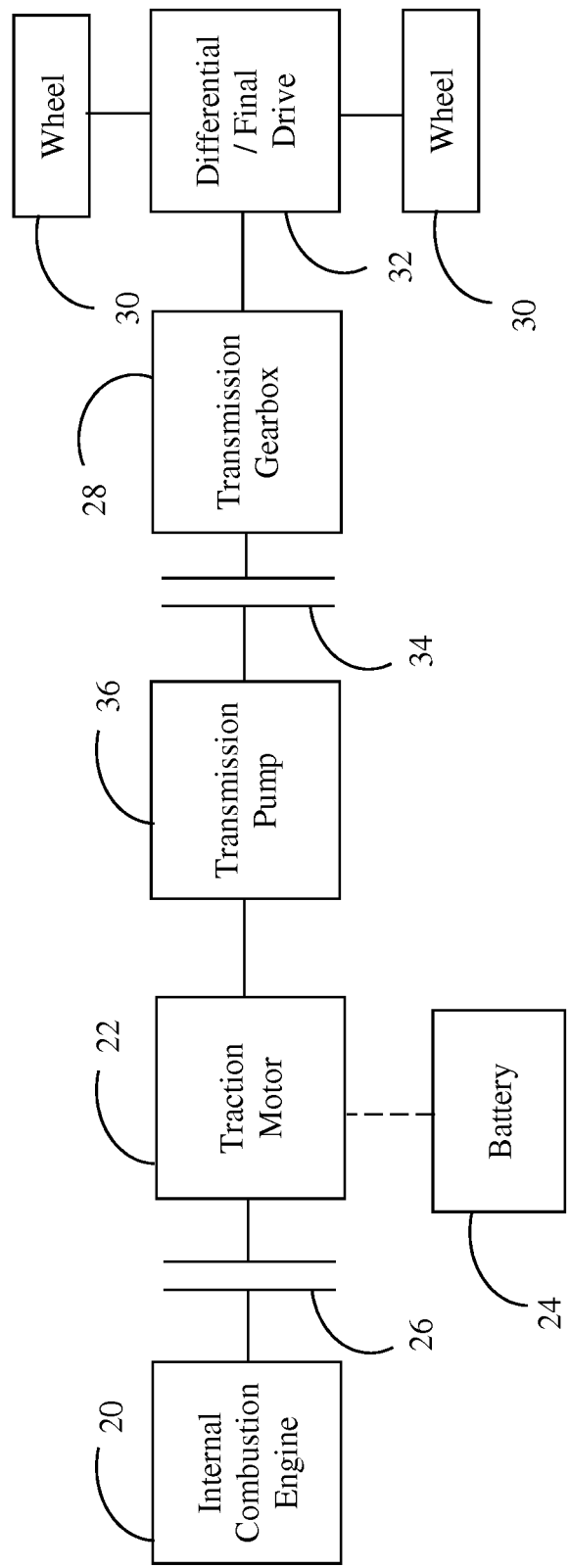
FIG. 1 is a block diagram of an exemplary hybrid vehicle powertrain in accordance with an embodiment of the present invention.

FIG. 1 illustrates a vehicle with a modular hybrid transmission. Solid lines connecting components in FIG. 1 indicate driveable connections which transfer power from an output of one component to an input of the other component by a mechanism that constrains the speed of the output to be proportional to the speed of the input. Driveable connection may be established, for example, by shafts or by gearing. Internal combustion engine 20 provides tractive torque during steady state operation. Traction motor 22 adds supplemental torque during transient events and can act as a generator during braking and at other times. Traction motor 22 is electrically connected to battery 24. Internal combustion engine 20 and traction motor 22 are selectively coupled by disconnect clutch 26. In other words, engine 20 and motor 22 are driveably connected when clutch 26 is engaged and are disconnected when clutch 26 is disengaged. Torque from the engine 20 and traction motor 22 are transferred by transmission gearbox 28 and differential 32 to a set of driving wheels 30. The transmission gearbox 28 selectively engages a transmission ratio such that the engine operates at an efficient speed over a wide range of vehicle speeds. The transmission can either be a step ratio transmission with a finite number of discrete ratios or a continuously variable transmission. The differential 32 permits the outside wheel to rotate slightly faster than the inside wheel as the vehicle turns a corner. Launch clutch 34 disconnects the engine 20 and the traction motor 22 from the transmission 28 and wheels 30 while the vehicle is stationary so the engine can idle. To launch the vehicle, launch clutch 34 is gradually engaged. Finally, transmission pump 36 provides hydraulic pressure to engage clutches, such as the disconnect clutch 26, the launch clutch 34, or clutches inside the transmission gearbox 28.

An MHT hybrid operates in several different operating modes. When the vehicle is stationary, launch clutch 34 is disengaged and the engine may either be idling or it may be off. If the engine is off, disconnect clutch 26 may also be disengaged. The traction motor may drive the transmission pump using power from the battery so that the transmission is ready when the driver indicates a desire to move. If the engine is idling, disconnect clutch 26 may be engaged. An engine controller adjusts engine torque to maintain a target idle speed. The engine controller may manipulate the throttle opening, fuel injection parameters, spark timing, etc. in order to adjust the engine torque. While the engine is idling, the traction motor may charge the battery by applying a charging torque.

When the vehicle is moving, the wheels are propelled by a combination of engine power and power from the battery. A controller determines how much combined torque to deliver based on the position of the accelerator pedal and the engine speed. The controller also chooses among the various transmission gear ratios and how to divide the demanded combined torque between the engine torque and the motor torque. The torque capability and efficiency of internal combustion engines and electric motors differ substantially. The torque capability of an internal combustion engine increases with engine speed over the majority of the operating range while electric motors are capable of producing high torque at low speed and less torque at high speed. Internal combustion engines are most efficient when operated at relatively low speed and close to their maximum torque capability. Electric motors are more efficient at low torque but inefficient at very low speed and high torques.

In some driving conditions, the motor can propel the vehicle using energy stored in the battery. During these conditions, the engine is off and the disconnect clutch is disengaged. Since no fuel is consumed in these driving conditions, overall fuel economy improves. In other driving conditions, the motor is used to permit the engine to operate more efficiently. Internal combustion engines tend to be more efficient at slow speed. However, internal combustion engines have a limited ability to generate power when operating at a low speed. Consequently, in a non-hybrid vehicle, it is sometimes necessary to operate the engine at a faster speed to deliver the requested amount of power to the wheels. In the modular hybrid, supplementing the engine torque with motor torque sometimes permits the transmission controller to select a gear ratio such that the engine runs slower and more efficiently.

Providing positive motor torque requires use of stored energy from the battery. Stored electrical energy is acquired by running the motor as a generator during braking maneuvers to capture energy that would otherwise be converted to heat by friction brakes. In some circumstances, the energy acquired from braking is not enough to satisfy the requirements. In such circumstances, the energy can be acquired by increasing the engine torque above the level required to propel the vehicle and operating the motor at negative torque to generate additional electrical energy. This increases the fuel usage during charging, but if done opportunistically a net fuel savings results.

Figure 2:
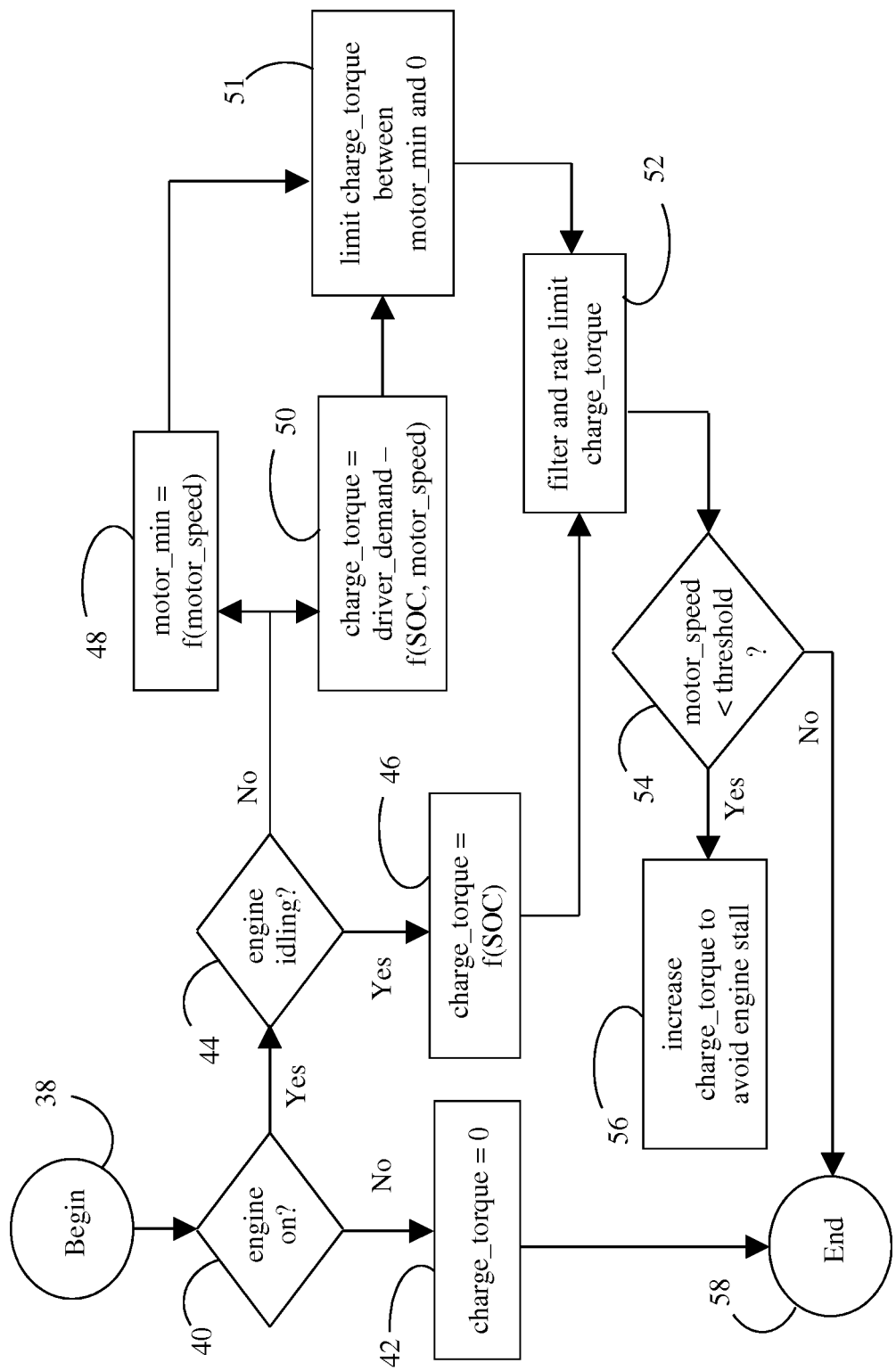
FIG. 2 is a flow chart illustrating an embodiment of the disclosed method.

A disclosed method for determining the charging torque in an MHT vehicle is illustrated in FIG. 2. The charging torque is negative when the traction motor is absorbing power from the engine to charge the battery. A more negative value indicates more power being diverted into the battery. In decision step 40, the controller determines whether the engine is on. If not, charging using engine power is impossible, so the charging torque is set to zero at step 42. If the engine is on, the controller determines whether the vehicle is in an idle condition at decision step 44. In an idle condition, the launch clutch is disengaged and the engine is controlled to maintain a particular engine speed. In an idle condition, the charging torque is the primary engine load. During an idle condition, the charging torque is computed as a function of state of charge at step 46. When the state of charge of the battery is low, charging torque is set to a very negative value to charge the battery more rapidly. When the state of charge is high, charging torque is set to zero or a slightly negative value to maintain the charge. If the vehicle is not in an idle condition, then it must be in a driving condition. The controller calculates a minimum motor torque at step 48 based on motor speed. The minimum engine speed is set to avoid requesting a combination of motor torque and motor speed at which the motor is inefficient. At step 50, a charge torque is calculated by subtracting a function of engine speed and state of charge from the driver demanded input torque. The function is calibrated to place the engine in an efficient operating condition. If the driver demand torque is low, the resulting charge torque will be highly negative implying that the battery is charged aggressively. However, if the driver demand is high, the charging torque is set to a less negative value in order to ensure sufficient engine power is available to satisfy the propulsion requirements. If the calculated charging torque is less than (more negative than) the minimum motor torque, then the charging torque is set to the minimum motor torque at 51. If the calculated charging torque is positive, then the charging torque is set to zero at 51. At step 52, the charging torque is filtered and rate limited to avoid sudden changes. Finally, at step 54, the controller checks whether the engine speed has fallen below a minimum. If the engine is slowing down excessively, the charging torque is adjusted to unload the engine at 56 (the charging torque is made less negative). The minimum is calibrated to ensure, among other criteria, that the transmission pump produces enough hydraulic pressure to engage the clutches. Although the engine is commanded to produce enough torque to maintain engine speed, there can be delays in the engine's reaction to changes in commanded torque. Because a motor responds quicker to changes in commanded torque, it is sometimes more effective to control engine speed by controlling the load.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of operating a powertrain comprising:
   while a motor is driveably connected to an engine by a first clutch and driveably disconnected from a transmission gearbox by a second clutch, operating the motor to generate a first charging torque based on a state of charge of a battery;
   in response to a decrease in engine speed, controlling the engine to increase the engine speed toward a predetermined engine idle speed; and
   in response to the engine speed decreasing below a threshold, further operating the motor to adjust the first charging torque to decrease the load on the engine.

2. The method of claim 1 further comprising:
   engaging the second clutch to driveably connect the motor to the transmission gearbox;
   controlling the engine to produce an engine torque based on the engine speed and the state of charge; and
   further operating the motor to generate a second charging torque such that a sum of the second charging torque and the engine torque satisfies a driver demanded net torque, wherein the driver demanded net torque is based on the engine speed and an accelerator pedal position.

3. The method of claim 2 further comprising:
   further operating the motor to generate a minimum charging torque, wherein the minimum charging torque is a based on engine speed.

4. The method of claim 2 further comprising:
   further operating the motor to generate a positive torque to assist the engine in satisfying the driver demanded net torque.

5. A method of operating a traction motor in a vehicle, the motor having a rotor selectively connected for rotation with an engine at a positive rotor speed by a first clutch and selectively connected to a transmission gearbox by a second clutch, the method comprising:
   with the first clutch engaged and the second clutch disengaged, applying a negative torque to the engine while generating electrical power, wherein the torque varies in response to changes in a state of charge of a battery and is substantially independent of the rotor speed for rotor speeds above a threshold; and
   in response to the rotor speed decreasing below the threshold, increasing the torque to decrease load on the engine.

6. The method of claim 5 further comprising:
   engaging the second clutch; and
   applying a positive torque to the transmission gearbox to propel the vehicle.

7. A vehicle powertrain comprising:
   an engine;
   a motor electrically connected to a battery;
   a first clutch configured to selectively couple the engine to the motor;
   a second clutch configured to selectively couple the motor to a gearbox; and
   a controller configured to
   while the first clutch is engaged and the second clutch is disengaged, operate the motor to generate a first charging torque based on a state of charge of the battery,
   respond to a decrease in engine speed resulting from a load on the engine associated with the first charging torque by controlling the engine to increase the engine speed toward a predetermined engine idle speed, and
   respond to the engine speed decreasing below a threshold by adjusting the first charging torque to decrease the load on the engine.

8. The vehicle powertrain of claim 7 wherein the controller is further configured to
   engage the second clutch;
   control the engine to produce an engine torque based on the engine speed and the state of charge; and
   control the motor to generate a second charging torque such that a sum of the second charging torque and the engine torque satisfies a driver demanded net torque, wherein the driver demanded net torque is based on the engine speed and an accelerator pedal position.

9. The vehicle powertrain of claim 8 wherein the controller is further programmed to control the motor to generate a positive torque to assist the engine in satisfying the driver demanded net torque.

* * * * *